(12) United States Patent
Hiroki

(10) Patent No.: US 7,281,700 B2
(45) Date of Patent: Oct. 16, 2007

(54) GATE VALVE APPARATUS FOR VACUUM PROCESSING SYSTEM

(75) Inventor: Tsutomu Hiroki, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 11/399,445

(22) Filed: Apr. 7, 2006

(65) Prior Publication Data

US 2006/0226388 A1 Oct. 12, 2006

Related U.S. Application Data

(60) Provisional application No. 60/675,889, filed on Apr. 29, 2005.

(30) Foreign Application Priority Data

Apr. 12, 2005 (JP) .............................. 2005-115111

(51) Int. Cl.
*F16K 31/00* (2006.01)
(52) U.S. Cl. ...................... 251/163; 251/192; 251/203
(58) Field of Classification Search ................ 251/162, 251/163, 188, 192, 203, 204
See application file for complete search history.

(56) References Cited

U.S. PATENT DOCUMENTS

| | | | | |
|---|---|---|---|---|
| 2,934,309 A | * | 4/1960 | Morser | 251/162 |
| 3,498,583 A | * | 3/1970 | Friedell | 251/162 |
| 3,675,894 A | * | 7/1972 | Friedell | 251/163 |
| 4,044,993 A | * | 8/1977 | Wheeler | 251/187 |
| 4,073,470 A | * | 2/1978 | Harris | 251/163 |
| 4,509,718 A | * | 4/1985 | Bormioli | 251/163 |
| 4,546,953 A | * | 10/1985 | Vinciguerra et al. | 251/162 |
| 4,548,384 A | * | 10/1985 | Harding | 251/163 |
| 4,627,567 A | * | 12/1986 | Thorn | 251/163 |
| 4,917,354 A | * | 4/1990 | Chambers | 251/163 |
| 4,921,212 A | * | 5/1990 | deQuay | 251/163 |
| 5,074,525 A | * | 12/1991 | Kujala | 251/188 |
| 6,089,537 A | | 7/2000 | Olmsted | |
| 6,206,029 B1 | | 3/2001 | Onodera | |
| 6,409,149 B1 | * | 6/2002 | Maher, Jr. | 251/301 |
| 6,494,434 B1 | | 12/2002 | Geiser | |
| 6,698,719 B2 | | 3/2004 | Geiser | |
| 6,932,111 B2 | | 8/2005 | Ishigaki | |

FOREIGN PATENT DOCUMENTS

| | | |
|---|---|---|
| EP | 0 684 415 A1 | 11/1995 |
| JP | 8-60374 | 3/1996 |
| WO | WO 02/05322 A2 | 1/2002 |

* cited by examiner

*Primary Examiner*—John Bastianelli
(74) *Attorney, Agent, or Firm*—Oblon, Spivak, McClelland, Maier & Neustadt, P.C.

(57) ABSTRACT

A gate valve apparatus includes a valve body to open and close a target object transfer port in a vacuum processing system. The valve body is reciprocated in a first direction relative to the transfer port. A support rod is connected to the valve body and extends in the first direction. A driving mechanism is configured to drive the valve body through the support rod. The driving mechanism includes a movable shaft structure reciprocated in a second direction perpendicular to the first direction. A first cam structure coupling the movable shaft structure to the support rod includes a portion that converts reciprocation movement of the movable shaft structure in the second direction into reciprocation movement of the support rod in the first direction. A swing drive is configured to swing the support rod and valve body about the central axis of the movable shaft structure.

20 Claims, 12 Drawing Sheets

GATE VALVE APPARATUS FOR VACUUM PROCESSING SYSTEM

CROSS-REFERENCE TO RELATED APPLICATIONS

This application claims the benefit of U.S. Provisional Application No. 60/675,889, filed Apr. 29, 2005.

This application is based upon and claims the benefit of priority from prior Japanese Patent Application No. 2005-115111, filed Apr. 12, 2005, the entire contents of which are incorporated herein by reference.

BACKGROUND OF THE INVENTION

1. Field of the Invention

The present invention relates to a gate valve apparatus for a vacuum processing system and a semiconductor processing system including a plurality of process chambers. The term "semiconductor process" used herein includes various kinds of processes which are performed to manufacture a semiconductor device or a structure having wiring layers, electrodes, and the like to be connected to a semiconductor device, on a target object, such as a semiconductor wafer or a glass substrate used for an LCD (Liquid Crystal Display) or FPD (Flat Panel Display), by forming semiconductor layers, insulating layers, and conductive layers in predetermined patterns on the target object.

2. Description of the Related Art

In general, in manufacturing semiconductor devices, various processes, such as dry etching, sputtering, and CVD (Chemical Vapor Deposition), are repeatedly performed on a semiconductor wafer. Most of these processes are performed in a vacuum atmosphere within process chambers. The process chambers have transfer ports for transferring the wafer, which are airtightly closed by gate valve apparatuses during the processes.

Patent Document 1 (Jpn. Pat. Appln. KOKAI Publication No. 8-60374), for example, discloses a gate value apparatus of this type. For example, a transfer port is formed in a sidewall of a process chamber that can be vacuum-exhausted, and has a size to allow a wafer to pass therethrough. The transfer port is provided with a gate valve apparatus. During a process, the transfer port is airtightly closed by the valve body of the gate valve apparatus with, e.g., an O-ring interposed therebetween.

In conventional gate valve apparatuses, the structures of an elevating mechanism for moving a valve body up and down and a pushing mechanism for pushing the valve body against a transfer port are complicated and bulky. Consequently, they require a high equipment cost and a large installation space, and entail problems in reliability due to the complexity of the structure.

BRIEF SUMMARY OF THE INVENTION

An object of the present invention is to provide a gate valve apparatus for a vacuum processing system, which has a simple structure to realize a smaller size and a lower cost, while maintaining high reliability in operation.

According to a first aspect of the present invention, there is provided a gate valve apparatus to be provided for a transfer port through which a target object passes in a vacuum processing system, the apparatus comprising:

a valve body configured to open and close the transfer port and to be moved close to and away from the transfer port by reciprocation movement of the valve body in a first direction;

a support rod connected to the valve body and extending in the first direction; and a driving mechanism configured to drive the valve body through the support rod, wherein the driving mechanism comprises a movable shaft structure extending in a second direction substantially perpendicular to the first direction and configured to be reciprocated in the second direction, a first cam structure coupling the movable shaft structure to the support rod, and including a portion configured to convert reciprocation movement of the movable shaft structure in the second direction into reciprocation movement of the support rod in the first direction, and a swing drive configured to swing the support rod and the valve body about a central axis of the movable shaft structure as a center.

According to a second aspect of the present invention, there is provided a semiconductor processing system comprising:

a pressure-adjustable common transfer chamber having a plurality of side surfaces;

pressure-adjustable first and second process chambers connected to two of the plurality of side surfaces and each configured to perform a semiconductor process on a target object;

a transfer mechanism disposed inside the common transfer chamber to transfer the target object into and from the first and second process chambers; and gate valve apparatuses respectively disposed between the common transfer chamber and the first process chamber and between the common transfer chamber and the second process chamber, wherein each of the gate valve apparatuses comprises a valve body configured to open and close a transfer port through which the target object passes, and to be moved close to and away from the transfer port by reciprocation movement of the valve body in a first direction, a support rod connected to the valve body and extending in the first direction, and a driving mechanism configured to drive the valve body through the support rod, and wherein the driving mechanism comprises a movable shaft structure extending in a second direction substantially perpendicular to the first direction and configured to be reciprocated in the second direction, a first cam structure coupling the movable shaft structure to the support rod, and including a portion configured to convert reciprocation movement of the movable shaft structure in the second direction into reciprocation movement of the support rod in the first direction, and a swing drive configured to swing the support rod and the valve body about a central axis of the movable shaft structure as a center.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
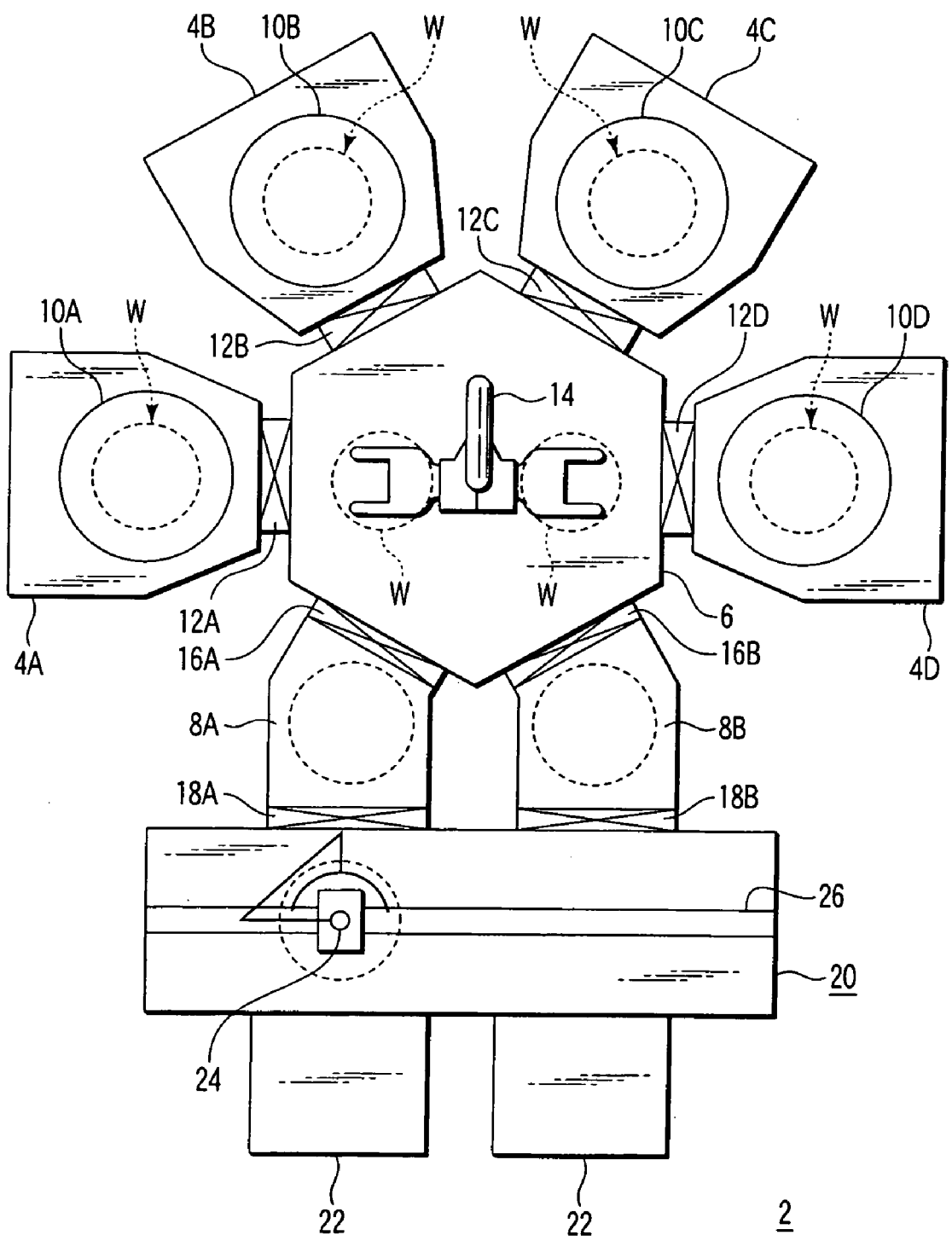
FIG. 1 is a plan view showing a processing system using gate valve apparatuses according to an embodiment of the present invention.

An embodiment of the present invention will now be described with reference to the accompanying drawings. In the following description, the constituent elements having substantially the same function and arrangement are denoted by the same reference numerals, and a repetitive description will be made only when necessary.

FIG. 1 is a plan view showing a processing system using gate valve apparatuses according to an embodiment of the present invention. As shown in FIG. 1, the processing system 2 includes a hexagonal common transfer chamber 6. Four process chambers 4A, 4B, 4C and 4D and two load-lock chambers 8A and 8B are connected to the common transfer chamber 6.

Specifically, each of the process chambers 4A to 4D is constructed such that the inner pressure thereof is adjustable by gas supply and vacuum-exhaust. The process chambers 4A to 4D include worktables 10A, 10B, 10C, and 10D, respectively, for placing a target object or semiconductor wafer W thereon. While the wafer W is placed on the worktable, various processes are performed. In general, these various processes are performed in a vacuum atmosphere. However, in some cases, the process is performed under atmospheric pressure, depending on the kind of the process. The respective process chambers 4A to 4D are connected to the corresponding sides of the transfer chamber 6 via gate valve apparatuses 12A, 12B, 12C and 12D.

The common transfer chamber 6 is also constructed such that the inner pressure thereof is adjustable by gas supply and vacuum-exhaust. A transfer mechanism 14, which is retractable/extendable and is rotatable in order to transfer the wafer W, is disposed within the transfer chamber 6. The transfer mechanism 14 can transfer the wafer W into and from the process chambers 4A to 4D via the gate valve apparatuses 12A to 12D that are opened.

Two load-lock chambers 8A and 8B are connected to the transfer chamber 6 via gate valve apparatuses 16A and 16B. Each of the load-lock chambers 8A and 8B is also constructed such that the inner pressure thereof is adjustable by gas supply and vacuum-exhaust. The load-lock chambers 8A and 8B are connected to a loader module 20 via the gate valve apparatuses 18A and 18B. The loader module 20 is provided with port devices 22 in which cassettes that contain a plurality of wafers W are disposed. A transfer arm mechanism 24, which is retractable/extendable and is rotatable, is disposed within the loader module 20 and movable along a guide rail 26. The transfer arm mechanism 24 can take in a wafer W from the cassette, which is placed in the port device 22, and can transfer it to the load-lock chambers 8A and 8B. The wafer W in the load-lock chamber 8A or 8B is taken in by the transfer mechanism 14 within the transfer chamber 6 and is loaded into the process chambers 4A to 4D, as described above. When the wafer W is to be unloaded, it is transferred through a path in a direction opposite to the direction of loading.

Figure 2:
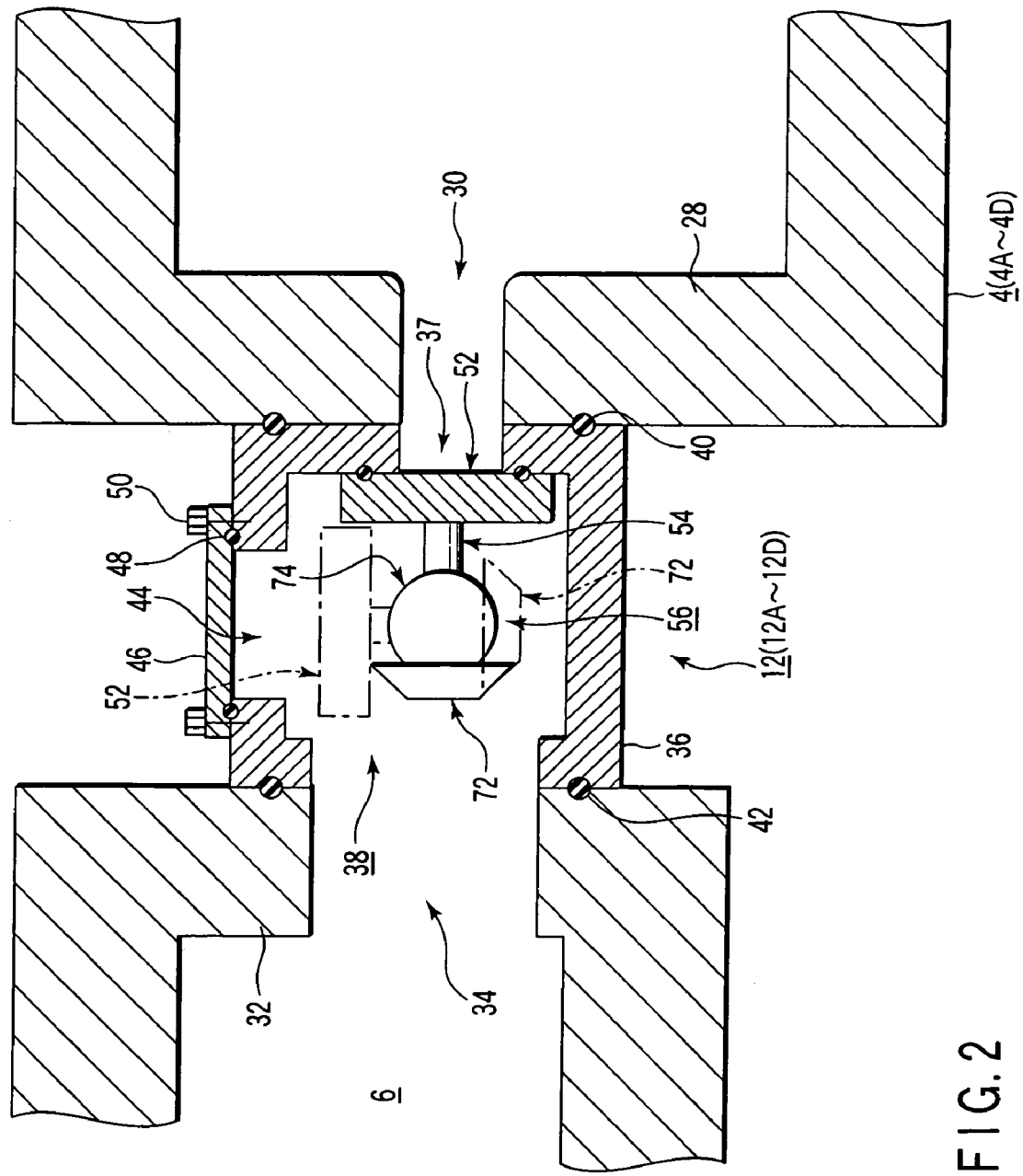
FIG. 2 is an enlarged sectional view showing a gate valve apparatus according to an embodiment of the invention.
Figure 3:
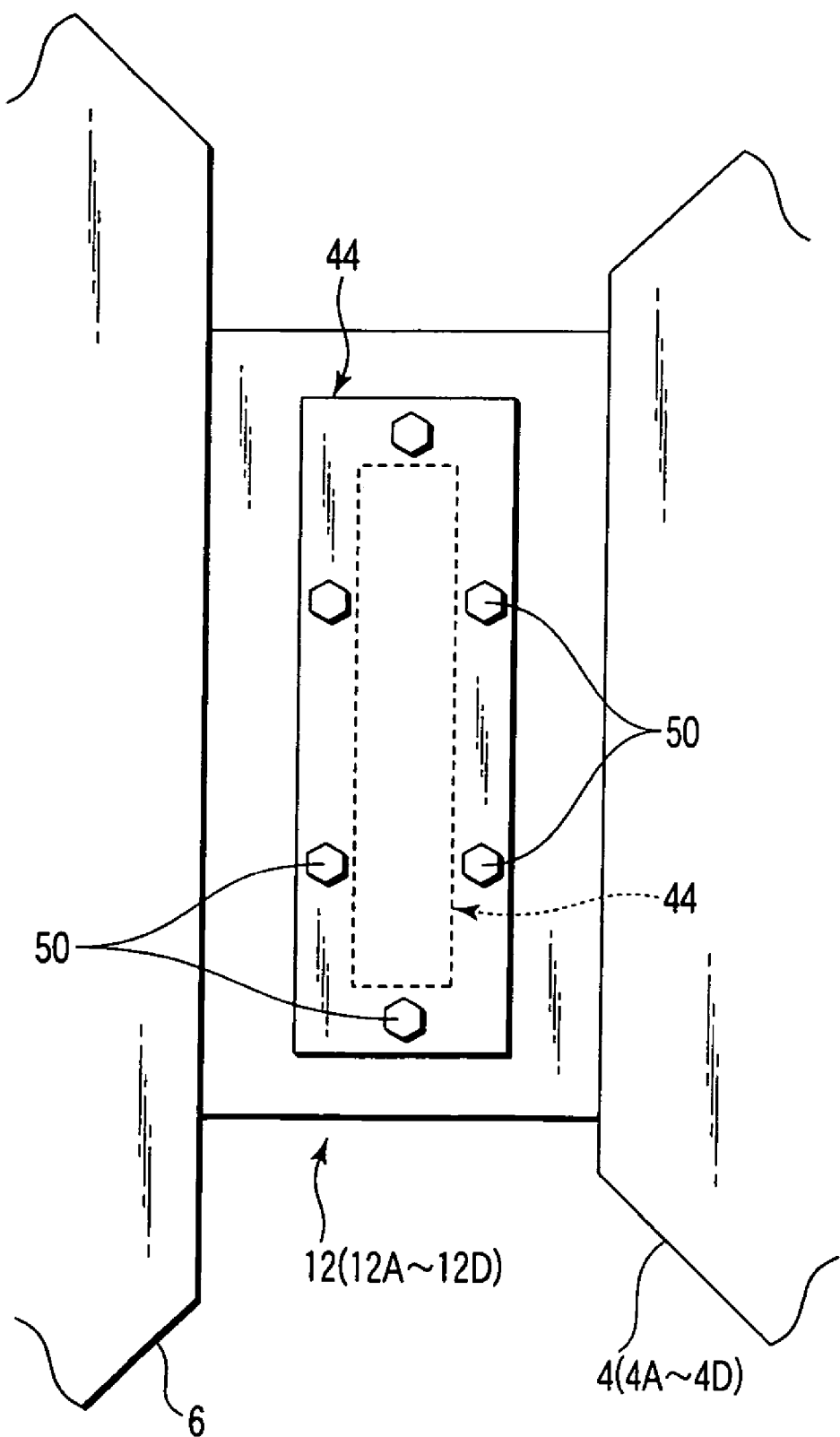
FIG. 3 is a top view of the gate valve apparatus shown in FIG. 2.

Next, an explanation will be given of the gate valve apparatuses 12A to 12D disposed between the transfer chamber 6 and the process chambers 4A to 4D. Since the gate valve apparatuses 12A to 12D have the same structure, these are representatively referred to as a gate valve apparatus 12, and the process chambers 4A to 4D are representatively referred to as a process chamber 4. FIG. 2 is an enlarged cross-sectional view showing a gate valve apparatus according to an embodiment of the invention. FIG. 3 is a top view of the gate valve apparatus shown in FIG. 2.

As shown in FIG. 2, an elongated port 30, through which the wafer W is transferred, is formed in a sidewall 28 defining the process chamber 4. In addition, a port 34 is formed in a sidewall 32 defining the transfer chamber 6. The gate valve apparatus 12 has a casing 36 that forms an outer shell that defines a transfer space through which the wafer W is passed. The casing 36 is a substantially cubic body formed of, e.g., aluminum, and the casing 36 has a substantially square cross section. An elongated transfer port 37 communicating with the inside of the process chamber 4 is formed on one side of the casing 36. An elongated port 38 communicating with the inside of the transfer chamber 6 is formed on the opposite side of the casing 36. O-rings 40 and 42 are provided at interfaces between the casing 36 and the process chamber 4 and transfer chamber 6 to keep these portions airtight. Within the casing 36, a valve body 52 for airtightly closing the transfer port 37 is attached to a driving mechanism 56. Since the transfer port 37 and transfer port 30 integrally communicate with each other, the transfer port 30 is opened/closed by opening/closing the transfer port 37.

As shown in FIGS. 2 and 3, an elongated maintenance port 44 for performing a maintenance operation, such as cleaning of the valve body 52, is formed in the ceiling of the casing 36. The maintenance port 44 is airtightly closed by a maintenance cover 46 via an O-ring 48. The maintenance cover 46 is attached to the outside of the casing 36. The maintenance cover 46 is detachably attached by a plurality of bolts 50. The maintenance cover 46 may be formed of a transparent plate such as an acrylic resin plate.

Figure 4:
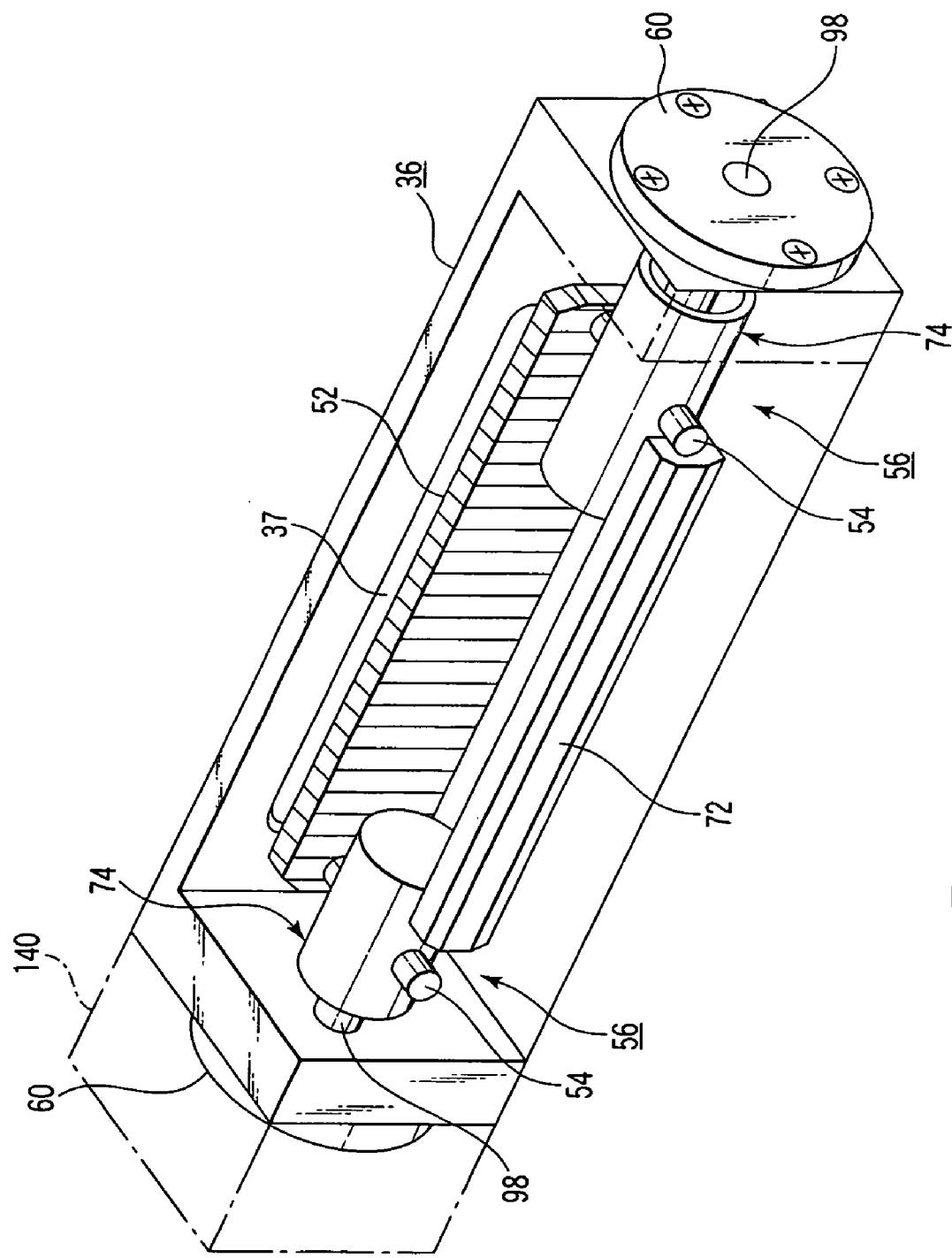
FIG. 4 is a perspective view of the gate valve apparatus shown in FIG. 2.
Figure 5:
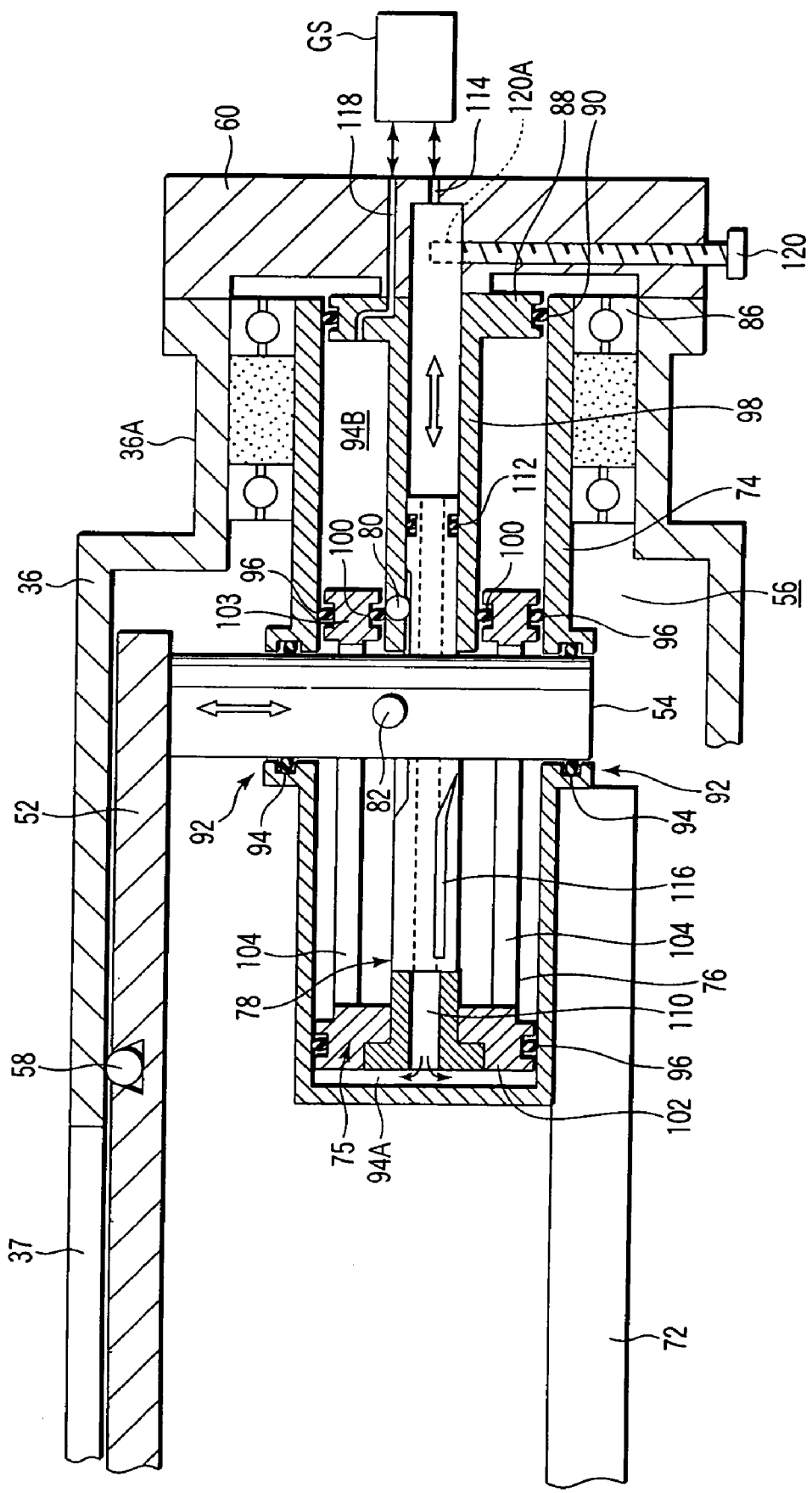
FIG. 5 is sectional view showing a driving mechanism used in the gate valve apparatus shown in FIG. 2.
Figure 6:
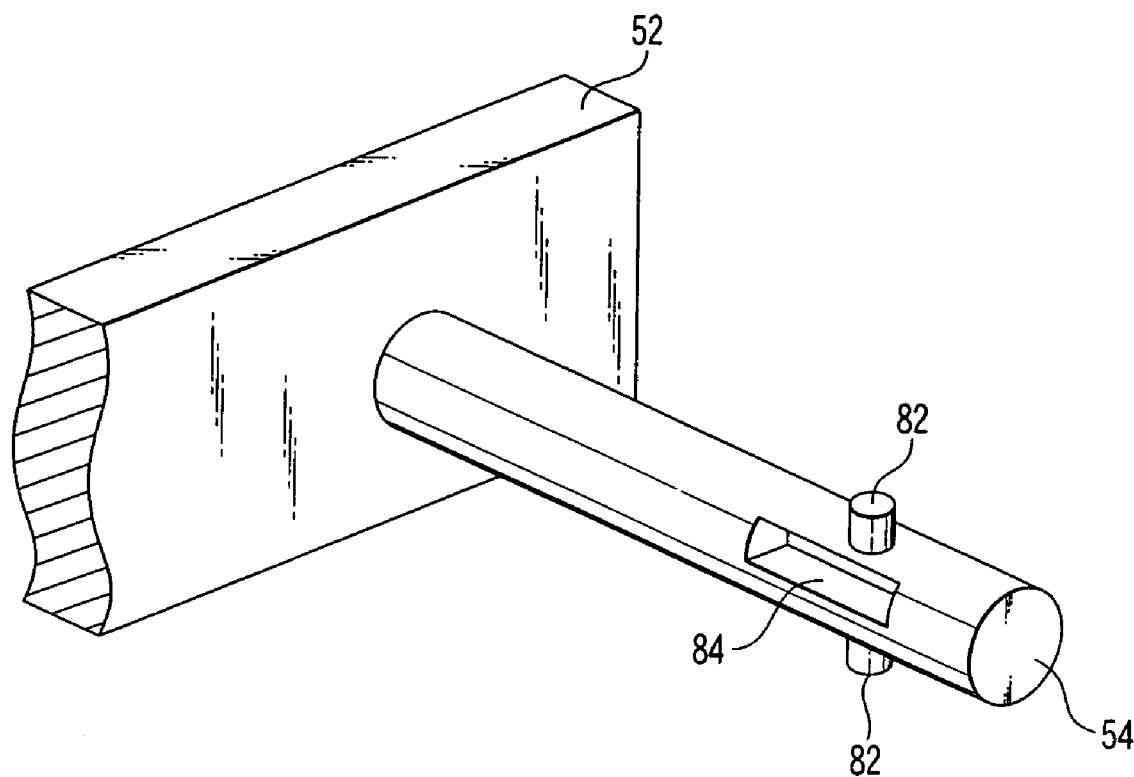
FIG. 6 is a perspective partial view showing the relationship between a valve body and a support rod in the gate valve apparatus shown in FIG. 2.

FIG. 4 is a perspective view of the gate valve apparatus 12 shown in FIG. 2. FIG. 5 is sectional view showing the driving mechanism 56 used in the gate valve apparatus 12 shown in FIG. 2. FIG. 6 is a perspective partial view showing the relationship between the valve body 52 and support rod 54 in the gate valve apparatus 12 shown in FIG. 2. As shown in FIGS. 4 and 5, the gate valve apparatus includes a valve body 52 configured to sit on the transfer port 37 to close it and to separate from the transfer port 37 to open it. A support rod 54 is connected near either of the opposite ends of the valve body 52 and extends by a predetermined length in a first direction (a direction in which the valve body 52 is moved close to and away from the transfer port 37). The support rod 54 is coupled to a driving mechanism 56, which includes a movable shaft structure 75 extending and reciprocable in a second direction substantially perpendicular to the first direction. The driving mechanism 56 is configured to convert reciprocation movement of the movable shaft structure 75 in the second direction, in time series, into reciprocation movement of the support rod 54 in the first direction and swing movement of the support rod 54 about the central axis of the movable shaft structure 75 as a center.

The valve body 52 has a rectangular shape corresponding to the shape of the transfer port 37. The front face of the valve body 52 is provided with a seal member 58 formed of, e.g., an O-ring (see FIG. 5) to surround and seal the transfer port 37. The driving mechanism 56 is disposed at each of the opposite ends to correspond to each support rod 54 and is attached to the surrounding wall or casing 36 by an attachment member 60. The movable casings (cylinders 74) of the two driving mechanisms 56 on the right and left sides are connected to each other by a plate-like reinforcing member 72, so that they can integrally rotate.

Figure 7:
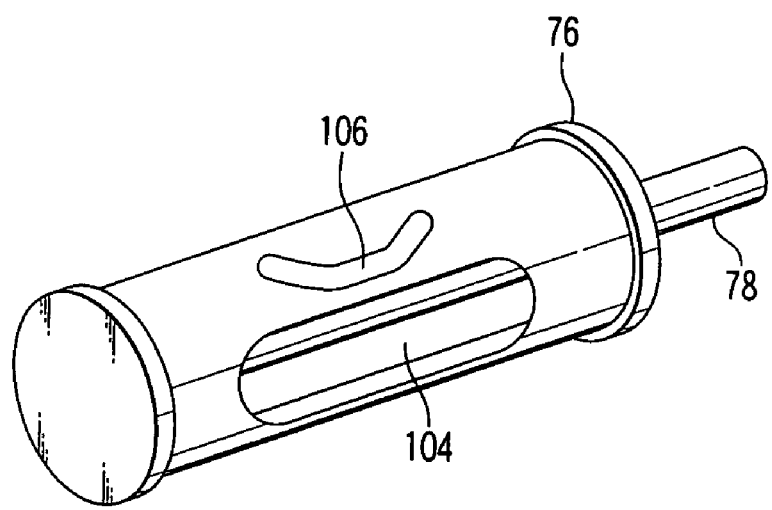
FIG. 7 is a perspective view showing a movable shaft structure used in the driving mechanism shown in FIG. 5.
Figure 8A:
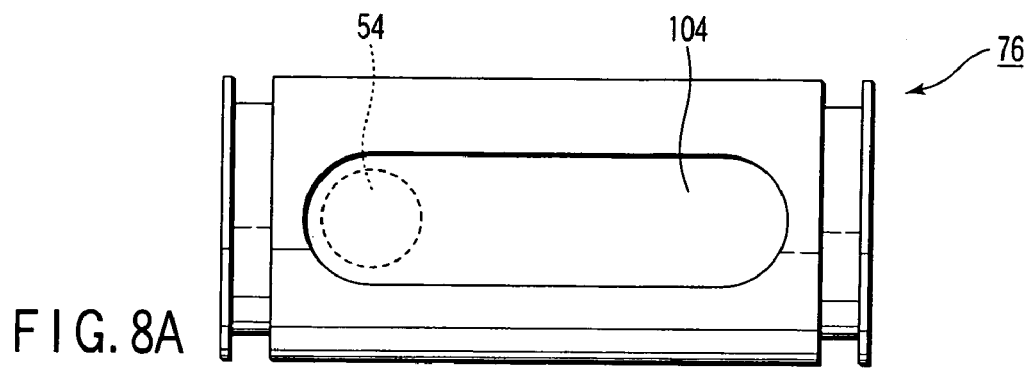
FIGS. 8A and 8B are a side view and a top view, respectively, showing a hollow shaft (outer shaft) used in the driving mechanism shown in FIG. 5.
Figure 8B:
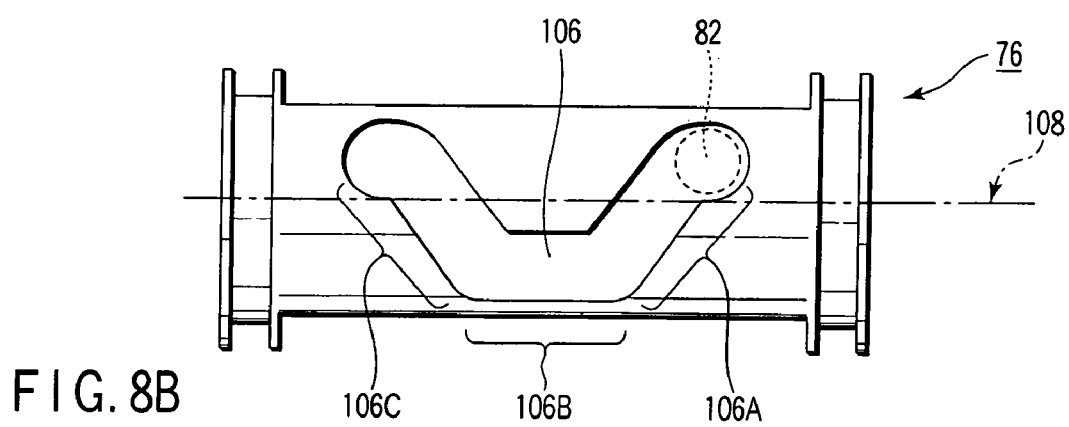
Figure 9A:
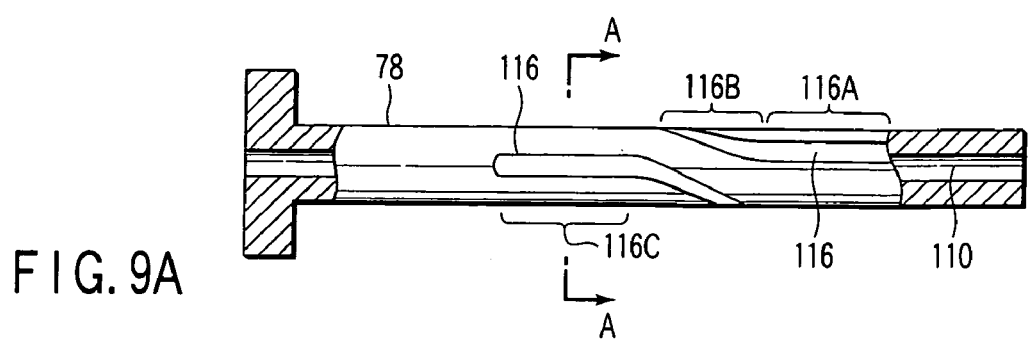
FIG. 9A is a sectional side view showing a spline shaft (inner shaft) used in the driving mechanism shown in FIG. 5.
Figure 9B:
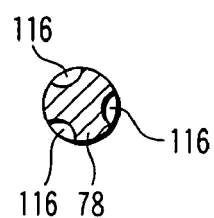
FIG. 9B is a sectional end view taken along line A-A in FIG. 9A.
Figure 11:
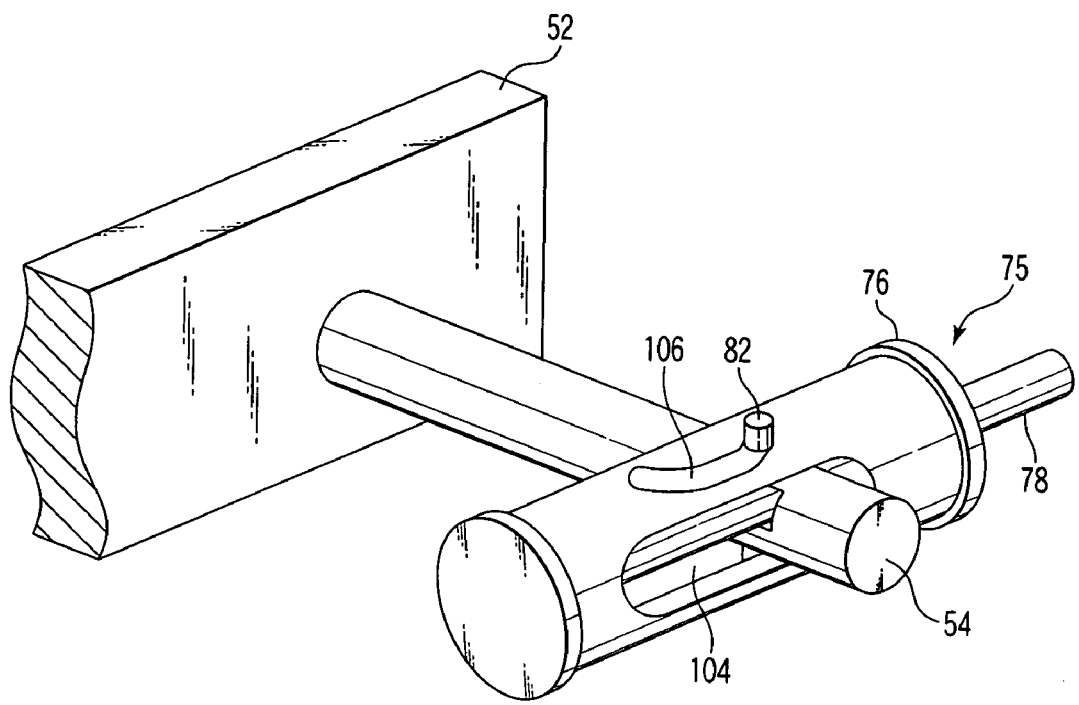
FIG. 11 is a perspective view showing the relationship of the support rod with the movable shaft structure of the driving mechanism shown in FIG. 5.
Figure 12:
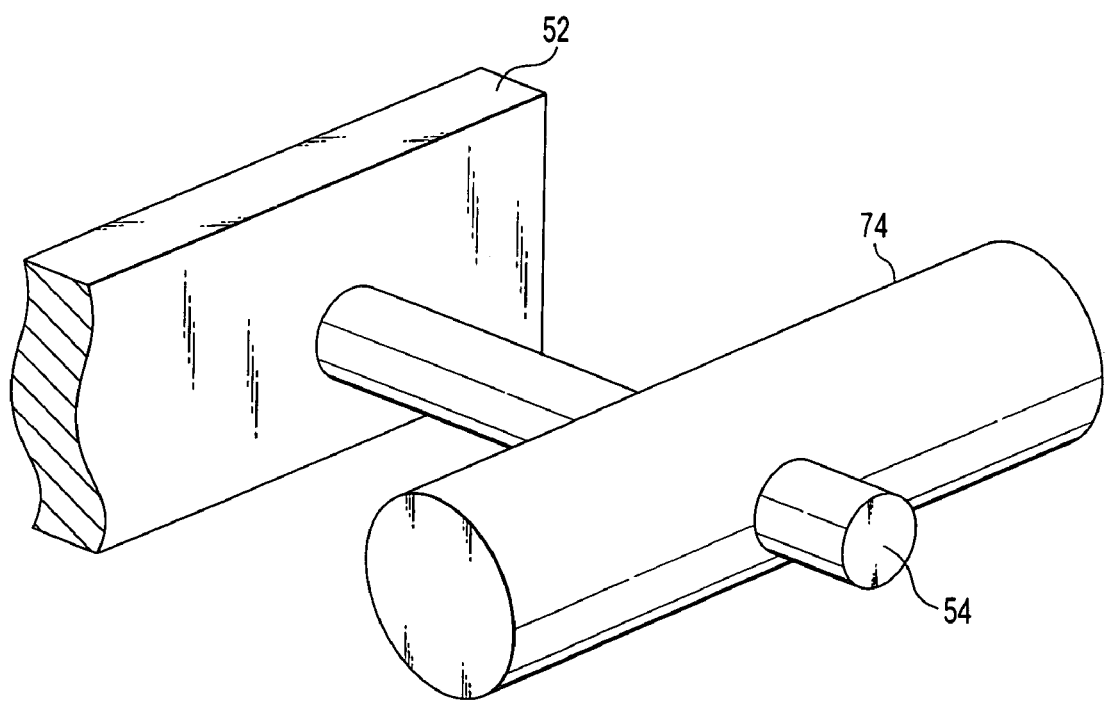
FIG. 12 is a perspective view showing the relationship of the support rod with the cylinder of the driving mechanism shown in FIG. 5.

The two driving mechanisms 56 on the right and left sides have the same specific structure except that they are arranged to be symmetrical. Accordingly, only the driving mechanism 56 on the right side in FIG. 4 will be explained below as a representative. FIG. 7 is a perspective view showing the movable shaft structure 75 used in the driving mechanism 56 shown in FIG. 5. FIGS. 8A and 8B are a side view and a top view, respectively, showing a hollow shaft (outer shaft) 76 used in the driving mechanism 56 shown in FIG. 5. FIG. 9A is a sectional side view showing a spline shaft (inner shaft) 78 used in the driving mechanism 56 shown in FIG. 5, and FIG. 9B is a sectional end view taken along line A-A in FIG. 9A. FIG. 11 is a perspective view showing the relationship of the support rod 54 with the movable shaft structure 75 of the driving mechanism 56 shown in FIG. 5. FIG. 12 is a perspective view showing the relationship of the support rod 54 with the cylinder 74 of the driving mechanism 56 shown in FIG. 5.

As shown in FIG. 5, the driving mechanism 56 includes the circular cylinder 74 with the proximal end rotatably supported by the surrounding wall or casing 36 and the movable shaft structure 75 slidably disposed in the cylinder 74. The movable shaft structure 75 comprises a spline shaft (inner shaft) 78 and a hollow shaft (outer shaft) 76 coaxially disposed to integrally reciprocate and rotate. The spline shaft 78 is inserted into an elongated guide tube 98 coaxially disposed in the cylinder 74, so that the spline shaft 78 reciprocates while being guided by the guide tube 98. The hollow shaft 76 has flange portions 102 and 103 (at least one of them serves as a piston head) at the opposite ends, with which the hollow shaft 76 reciprocates while being guided by the inner surface of the cylinder 74.

The support rod 54 has a pair of projections or cam pins (engaging elements) 82 protruding upward and downward at the rod distal end. Each of the cam pins 82 has a small length, so that they can be accommodated in the cylinder 74. The support rod 54 has a long slot 84 penetrating it in the traverse direction. The long slot 84 has a predetermined length, such that the position of the cam pins 82 of the support rod 54 is near the center of the length. The spline shaft 78 is inserted in the long slot 84 with a clearance, and the support rod 54 can move in its axial direction within a range given by the length of the long slot 84 (see FIG. 11).

The proximal end of the cylinder 74 is rotatably supported by a flange portion 36A of the casing 36 through a bearing 86 provided with a magnetic fluid seal to keep this portion airtight. The proximal end of the flange portion 36A is fixed to and covered with the attachment member 60 formed of a thick plate. The cylinder 74 has an opening at the proximal end, in which a circular lid member 88 integrated with the attachment member 60 is disposed with a seal member 90 formed of, e.g., an O-ring interposed therebetween, so that they can slide relative to each other. In other words, the seal member 90 allows the cylinder 74 to rotate while keeping the interior of the cylinder 74 airtight. On the other hand, the distal end of the cylinder 74 is closed.

The cylinder 74 has a pair of openings 92 (see FIGS. 5 and 14A to 14D) formed in the sidewall, in which the support rod 54 is slidably inserted. The opening 92 is provided with a seal member 94 formed of, e.g., an O-ring around it, so that the support rod 54 can slide while keeping the interior of the cylinder 74 airtight. The cylinders 74 of the two driving mechanisms 56 disposed for the support rods 54 on the opposite sides of the valve body 52 are connected by the reinforcing member 72.

The hollow shaft 76 of the movable shaft structure 75 is provided with the flange portions 102 and 103 at the opposite ends, which have a diameter slightly larger than the inner portion. The flange portions 102 and 103 are airtightly slidaby disposed in the cylinder 74 with a seal member 96 formed of, e.g., an O-ring interposed therebetween. In order not to hinder movement of the cam pins 82 within the cylinder 74, the ends of the flange portions 102 and 103 are radially further outward than the distal ends of the cam pins 82. The flange portion 103 of the hollow shaft 76 at the proximal end side has an opening, in which the elongated guide tube (base portion) 98 is inserted from the lid member 88 (see FIG. 5). This opening of the flange portion 103 is provided with a seal member 100 formed of, e.g., an O-ring, so that the flange portion 103 can airtightly slide relative to the inserted guide tube 98.

The flange portions 102 and 103 serve as a piston head to divide the interior of the cylinder 74 into two airtight spaces 94A and 94B. As described later, the airtight spaces 94A and 94B are supplied with pressurized air or pressurized nitrogen to drive the movable shaft structure 75 by the piston head. In this embodiment, both the flange portions 102 and 103 serve as a piston head (to airtightly divide the interior of the cylinder), but it suffices if only one of them serves as a piston head.

The hollow shaft 76 has a pair of clearance long slots 104 formed in the sidewall (extending in the horizontal direction in FIG. 5), in which the support rod 54 is inserted with a clearance (see FIG. 8A). The clearance long slot 104 has a predetermined length in the axial direction of the hollow shaft 76, and the hollow shaft 76 can move in its axial direction relative to the support rod 54 within a range given by the length of the long slot 104.

The hollow shaft 76 further has a pair of cam slots 106 formed in the sidewall at positions (on the upper and lower sides in FIG. 11), which are shifted by an angle of 90° from the clearance long slots 104 in the annular direction (see FIG. 8B). Specifically, as shown in FIG. 8B, the cam slot 106 includes two slanted guides 106A and 106C (which are slanted relative to the central axis 108 of the movable shaft structure 75) and a linear guide 106B (which is in parallel with the central axis 108 of the movable shaft structure 75) connecting the slanted guides 106A and 106C, so that they form a U-shape or V-shape. The slanted guide 106A on the right side in FIG. 8B is used for supplying reciprocation movement to the support rod 54 when the valve body 52 is moved close to and away from the transfer port 37. The linear guide 106B on the middle side is used for supplying rotation movement to the support rod 54 when the valve body 52 is rotated upward and downward relative to the transfer port 37. The slanted guide 106C on the left side is used for supplying reciprocation movement to the support rod 54 when the valve body 52 is moved close to and away from the maintenance port 44. If the driving mechanism 56 is not used for moving the valve body 52 to the maintenance port 44, the slanted guide 106C on the left side is unnecessary.

Figure 13A:
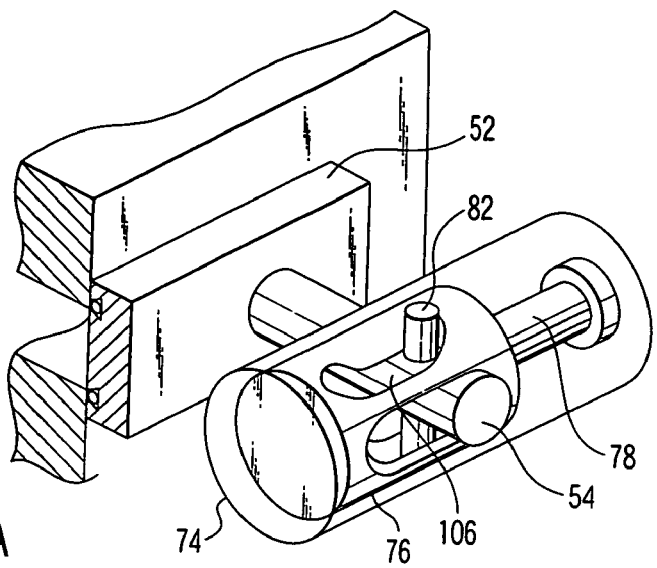
FIGS. 13A, 13B, and 13C are perspective views schematically showing a manner of driving the valve body by the driving mechanism shown in FIG. 5.
Figure 13B:
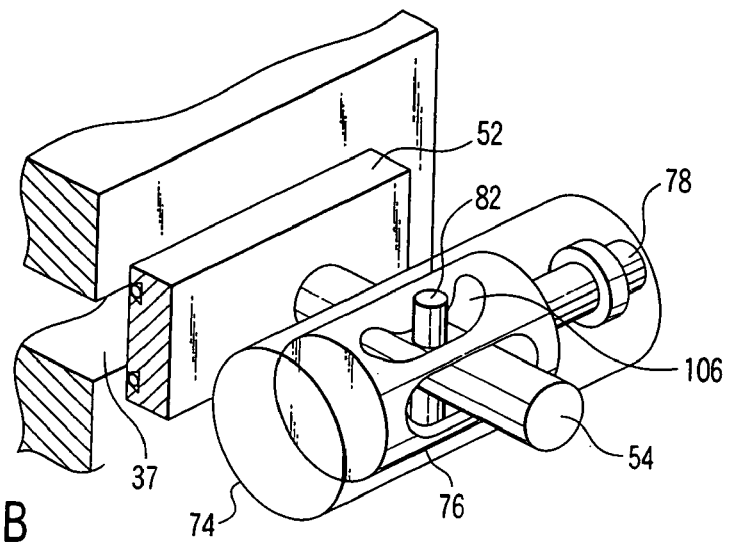
Figure 13C:
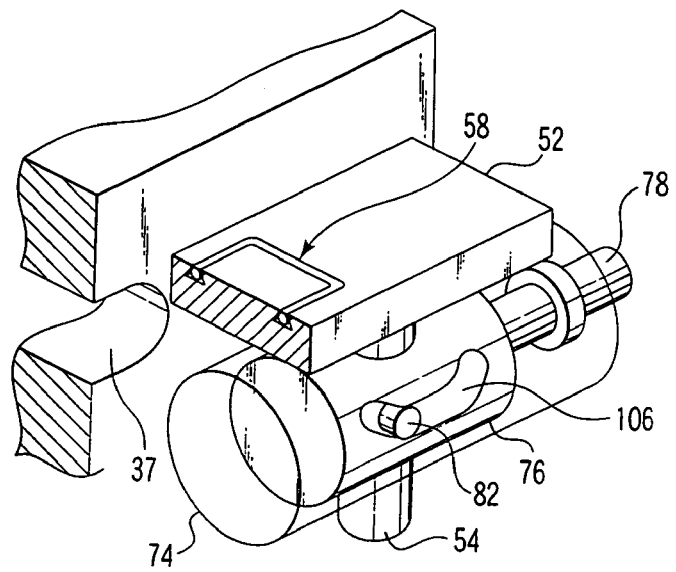

FIGS. 13A, 13B, and 13C are perspective views schematically showing a manner of driving the valve body 52 by the driving mechanism 56 shown in FIG. 5. FIGS. 14A, 14B, 14C, and 14D are diagrams showing a manner of driving the valve body 52 by the driving mechanism 56 shown in FIG. 5. As shown in these figures, when the movable shaft structure 75 is moved in its axial direction, the valve body 52 is moved back and forth and rotated along with the support rod 54. As described above, when the support rod 54 is reciprocated, the slanted guide 106A or 106C engages with the cam pin 82 (see FIGS. 13A and 13C). When the support rod 54 is rotated, the linear guide 106B engages with the cam pin 82 (see FIG. 13B).

The spline shaft 78 shown in FIGS. 9A and 9B is inserted in the hollow shaft 76, and the distal end of the spline shaft 78 is attached and fixed to the flange portion 102 of the hollow shaft 76 on the distal end side. The proximal end of the spline shaft 78 is slidably inserted in the guide tube 98 with the seal member 112 formed of, e.g., an O-ring interposed therebetween. The spline shaft 78 has a gas passage 110 penetrating along the central axis, through which a pressurized gas is supplied into the airtight space 94A on the distal end side. When the pressurized gas is supplied into the airtight space 94A on the distal end side, the movable shaft structure 75 is moved to the right in FIG. 5. On the other hand, when the pressurized gas is supplied into the airtight space 94B on the proximal end side, the movable shaft structure 75 is moved to the left in FIG. 5. FIG. 5 shows a state where the movable shaft structure 75 has been moved to the leftmost position.

A first gas port 114 for supplying and exhausting the pressurized gas to and from the guide tube 98 is formed in the attachment member 60 disposed at the proximal end of the guide tube. The pressurized gas is supplied into and exhausted from the airtight space 94A through the first gas port 114. Further, a second gas port 118 for supplying and exhausting the pressurized gas into and from the other airtight space 94B is formed in the attachment member 60 and lid member 88 (see FIG. 5). A gas charge/discharge unit GS is arranged to supply and exhaust the pressurized gas to and from the first and second gas ports 114 and 118.

The spline shaft 78 has cam grooves 116 formed thereon and extending in its longitudinal direction. The cam grooves 116 comprise a plurality of grooves, e.g., three grooves in the shaft 78 shown in FIGS. 9A and 9B, disposed equidistantly in the annular direction. As shown in FIG. 5, each of the cam grooves 116 engages with a spherical or cylindrical contact element (engaging element) 80, which is rotatably disposed near the distal end of the guide tube 98. The spline shaft 78 is guided by the guide tube 98 in the axial direction to keep the engagement between the contact elements 80 and cam grooves 116.

Specifically, as shown in FIG. 9A, each of the cam grooves 116 includes a slanted guide 116B (which is slanted relative to the central axis 108 of the movable shaft structure 75) at the middle and two linear guides 116A and 116C (which are in parallel with the central axis 108 of the movable shaft structure 75) connected by the slanted guide 116B. The linear guide 116A, slanted guide 116B, and linear guide 116C of the cam groove 116 are arranged to positionally correspond to the slanted guide 106A, linear guide 106B, and slanted guide 106C of the cam slot 106, respectively. Accordingly, the linear guide 116A on the right side in FIG. 9B is used for supplying axial movement to the hollow shaft 76 when the valve body 52 is moved close to and away from the transfer port 37. The slanted guide 116B on the middle side is used for supplying rotation movement to the hollow shaft 76 when the valve body 52 is rotated upward and downward relative to the transfer port 37. The linear guide 116C on the left side is used for supplying axial movement to the hollow shaft 76 when the valve body 52 is moved close to and away from the maintenance port 44. If the driving mechanism 56 is not used for moving the valve body 52 to the maintenance port 44, the linear guide 116C on the left side is unnecessary.

Figure 10A:
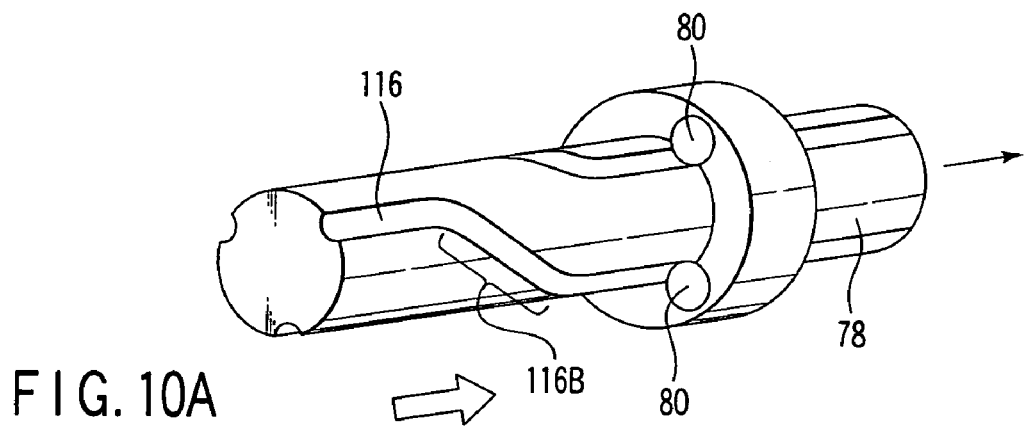
FIGS. 10A, 10B, and 10C are perspective views showing rotation of the spline shaft used in the driving mechanism shown in FIG. 5.
Figure 10B:
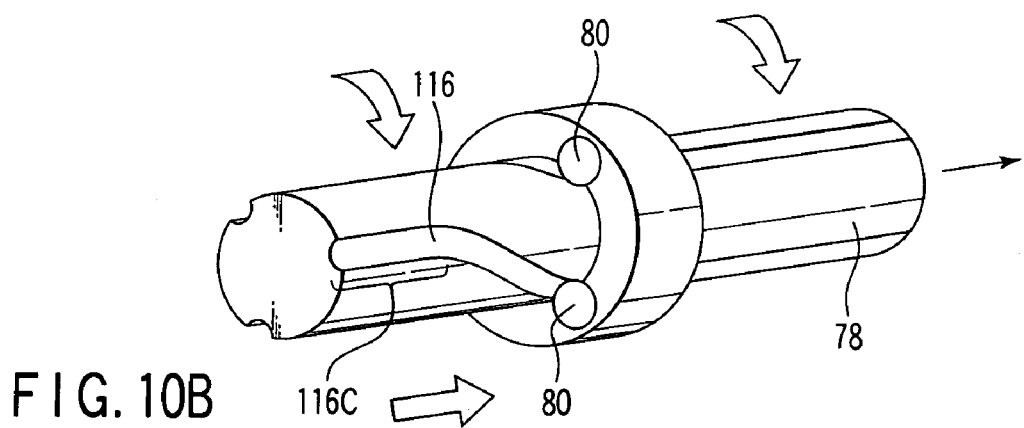
Figure 10C:
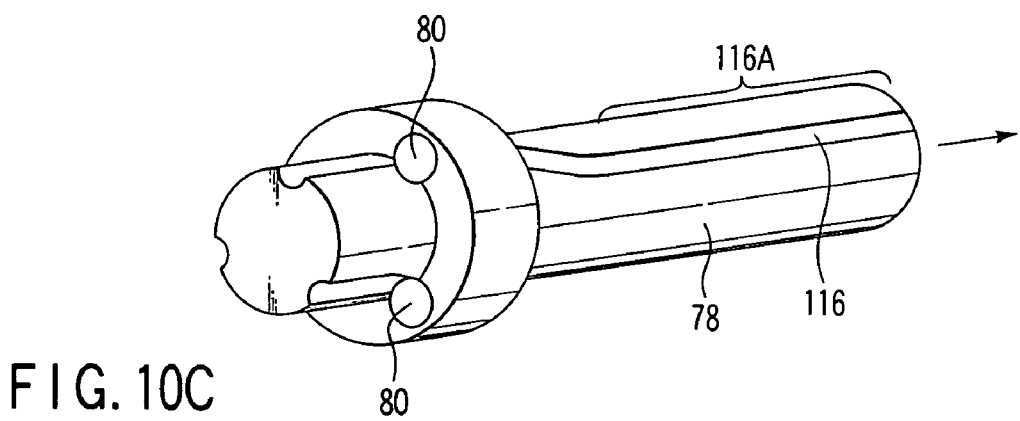

FIGS. 10A, 10B, and 10C are perspective views showing rotation of the spline shaft 78 used in the driving mechanism 56 shown in FIG. 5. As described above, since each of the contact elements 80 is fitted at a predetermined position in the guide tube 98, the contact element 80 is held stationary relative to the cylinder 74. Consequently, when the spline shaft 78 is moved to the right in FIGS. 10A to 10C, within the range where the linear guide 116A or 116C engages with the contact element 80, the spline shaft 78 is moved to the right without rotation. However, within the range where the slanted guide 116B engages with the contact element 80, the spline shaft 78 is moved to the right while being rotated in a certain direction. On the other hand, when the spline shaft 78 is moved to the left, the spline shaft 78 is moved in reverse to those described above.

Back to FIG. 5, the attachment member 60 is provided with a stopper screw 120, whose tip can be projected into and retreated from the hollow portion of the guide tube 98 on the proximal end side, as needed. Except for the time when a maintenance operation is preformed on the valve body 52, the tip of the stopper screw 120 is projected into the hollow portion to prevent the spline shaft 78 from being moved to the right (the deeper side) any more from the state shown in FIG. 5.

Next, an explanation will be given of an operation of the gate valve apparatus 12 having the structure described above.

When a wafer W is not transferred therethrough, such as when a process is performed, the valve body 52 is used to airtightly close the transfer port 37 connected to the process chamber 4 (the state shown with solid lines in FIG. 2). On the other hand, when a wafer W is transferred therethrough into and from the process chamber 4, the valve body 52 is separated from the transfer port 37. Then, the valve body 52 is rotated upward or downward by an angle of 90°, and the wafer W is transferred through the gap between the valve body 52 and reinforcing member 72 in this state. This state is shown with chain lines in FIG. 2, wherein the valve body 52 is rotated upward by 90° in this embodiment. When a maintenance operation is preformed on the valve body 52, the valve body 52 is moved upward form the state shown with the chain lines in FIG. 2, and is brought into airtight contact with the maintenance port 44. Then, the maintenance cover 46 (see FIG. 3) is detached, and the maintenance operation is preformed on the valve body 52.

Next, a detailed explanation will be given of an operation of the gate valve apparatus 12.

The serial movement of the gate valve apparatus 12 described above is performed by reciprocation movement of the movable shaft structure 75 within the cylinder 74 of each of the driving mechanisms 56. At this time, the two driving mechanism 56 disposed on the opposite sides of the valve body 52 are operated in synchronism with each other.

When the movable shaft structure 75 is moved back and forth, a pressurized gas is supplied into the airtight space 94A on the left side or the airtight space 94B on the right side in FIG. 5. When the pressurized gas is supplied into one of the airtight spaces, the pressurized gas in the other airtight space is exhausted, so that the hollow shaft 76 can be smoothly moved. For example, when the pressurized gas is supplied into the airtight space 94A, it is supplied through the first gas port 114 formed in the attachment member 60. This pressurized gas flows through the guide tube 98 and the gas passage 110 formed at the center of the spline shaft 78 into the airtight space 94A. When the pressurized gas is supplied into the airtight space 94B, it is supplied through the second gas port 118. The pressure of the pressurized gas is set at, e.g., about 5 Kg/cm$^2$.

Figure 14A:
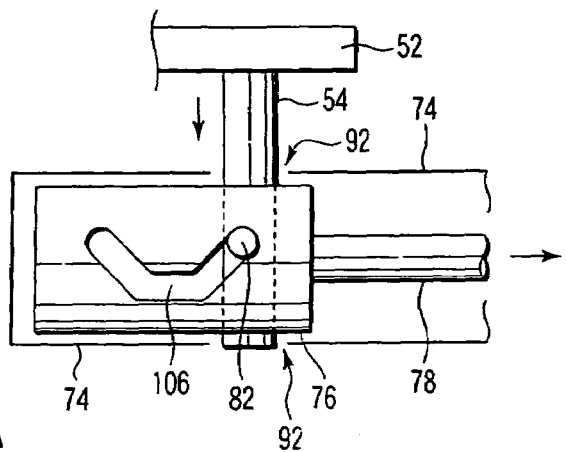
FIGS. 14A, 14B, 14C, and 14D are diagrams showing a manner of driving the valve body by the driving mechanism shown in FIG. 5.
Figure 14B:
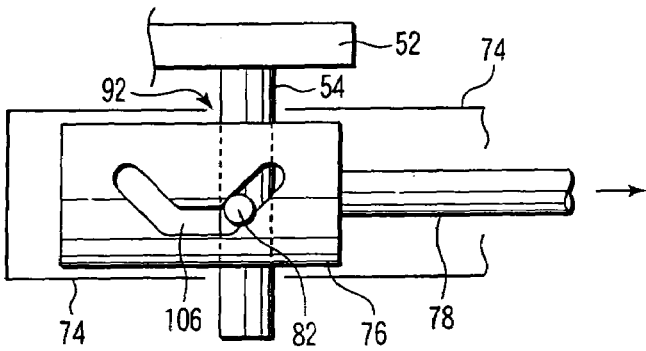
Figure 14C:
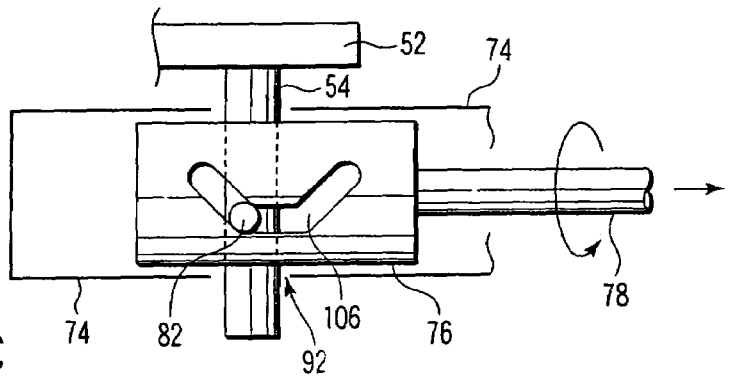

FIG. 5 shows a state where the valve body 52 is pushed against the transfer port 37 to close the transfer port 37 (see FIGS. 13A and 14A). At this time, the hollow shaft 76 is present at the leftmost position. In this state, each cam pin 82 of the support rod 54 is present at the rightmost position in the slanted guide 106A (see FIG. 8B) on the right side of the cam slot 106 of the hollow shaft 76. Form this state, the pressurized gas is gradually supplied into the airtight space 94A on the left side, so that the movable shaft structure 75 is gradually moved to the right. Consequently, the valve body 52 is operated, as follows.

At first, the spline shaft 78 is moved in its axial direction while the linear guide 116A (see FIG. 9A) of each cam groove 116 of the spline shaft 78 engages with the contact element 80. Within this range, the spline shaft 78 is moved to the right along with the hollow shaft 76 without rotation. At this time, each cam pin 82 is moved along the slanted guide 106A of the cam slot 106 of the hollow shaft 76. Consequently, the support rod 54 is moved in its axial direction to separate the valve body 52 connected thereto from the transfer port 37, which is thus opened (see FIGS. 13B and 14B). Accordingly, looking at both directions of reciprocation movement of the movable shaft structure 75, within the range where the linear guide 116A of the cam groove 116 engages with the contact element 80 and the slanted guide 106A of the cam slot 106 engages with the cam pin 82, the valve body 52 is moved close to and away from the transfer port 37.

Then, the spline shaft 78 is moved in its axial direction while the slanted guide 116B (see FIG. 9A) of each cam groove 116 of the spline shaft 78 engages with the contact element 80. Within this range, the spline shaft 78 is rotated along with the hollow shaft 76 and cylinder 74 about the central axis of the movable shaft structure 75. During this rotation, the spline shaft 78 is supported by the guide tube 98, and the cylinder 74 is supported by the bearing 86 disposed at the proximal end. At this time, each cam pin 82 is moved along the linear guide 106B of the cam slot 106 of the hollow shaft 76. Consequently, the support rod 54 is rotated by an angle of 90° to swing the valve body 52 connected thereto upward from a position facing the transfer port 37 (to a position facing the maintenance port 44 in this embodiment) (see FIGS. 13C and 14C). Accordingly, looking at both directions of reciprocation movement of the movable shaft structure 75, within the range where the slanted guide 116B of the cam groove 116 engages with the contact element 80 and the linear guide 106B of the cam slot 106 engages with the cam pin 82, the valve body 52 is rotated between the position facing the transfer port 37 and the position facing the maintenance port 44.

As described above, in the state where the valve body 52 has been rotated by an angle of 90° to face upward (the state of the valve body 52 shown with chain lines in FIG. 2), a wafer W is transferred through the gap between the valve body 52 and reinforcing member 72. During the normal running of repeating transfer and process operations of wafers W, the tip of the stopper screw 120 disposed in the attachment member 60 is projected into the guide tube 98, as shown with broken lines 120A in FIG. 5. The tip of the stopper screw 120 thus projected stops the spline shaft 78 from being further moved to the right (the deeper side). Accordingly, the cam pin 82 can be moved back and forth only along the linear guide 106B and slanted guide 106A, so as to cause the valve body 52 to perform the opening/closing operation and 90°-rotation movement continuously in time series. In other words, where the movable shaft structure 75 is reciprocated, the driving force thereof is converted into a pushing force and a rotation force of the valve body 52 in time series.

It should be noted that the bent shape of the cam slot 106 of the hollow shaft 76 does not necessarily have to agree with the bent shape of the cam groove 116 of the spline shaft 78. For example, as long as the valve body 52 does not interfere with the surrounding wall of the casing 36, the shapes of the cam slot 106 and cam groove 116 may be designed such that rotation of the valve body 52 is started while the valve body 52 is being retreated.

Next, an explanation will be given of an operation of the valve body 52 when a maintenance operation is performed.

At this time, the tip of the stopper screw 120 disposed in the attachment member 60 is adjusted to retreat from the guide tube 98, as shown in FIG. 5, to allow the spline shaft 78 to be further moved to the deeper side (to the right in FIG. 5). Form this state, the pressurized gas is gradually supplied in the airtight space 94A on the left side, so that the movable shaft structure 75 is gradually further moved to the right. Consequently, the valve body 52 is operated, as follows.

At first, the spline shaft 78 is moved in its axial direction while the linear guide 116C (see FIG. 9A) of each cam groove 116 of the spline shaft 78 engages with the contact element 80. Within this range, the spline shaft 78 is moved to the right along with the hollow shaft 76 without rotation. At this time, each cam pin 82 is moved along the slanted guide 106C of the cam slot 106 of the hollow shaft 76.

Figure 14D:
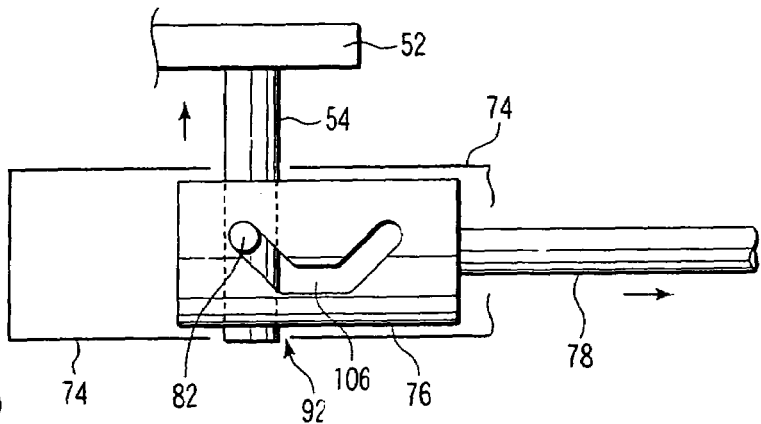

Consequently, the support rod 54 is moved in its axial direction to move the valve body 52 connected thereto upward from the state where the valve body 52 faces upward (see FIGS. 13C and 14C), thereby bringing the valve body 52 into airtight contact with the maintenance port 44, which is thus closed (see FIGS. 2 and 14D). Then, the maintenance cover 46 is detached, and the maintenance operation is performed on the valve body 52. Accordingly, looking at both directions of reciprocation movement of the movable shaft structure 75, within the range where the linear guide 116C of the cam groove 116 engages with the contact element 80 and the slanted guide 106C of the cam slot 106 engages with the cam pin 82, the valve body 52 is moved close to and away from the maintenance port 44.

As described above, the driving mechanism 56 is arranged to convert a driving force applied to the movable shaft structure 75 in the axial direction into a pushing force and a rotation force of the valve body 52 in time series. Consequently, the apparatus can be simplified to realize a smaller size and a lower cost, while improving the reliability in operation.

Figure 15:
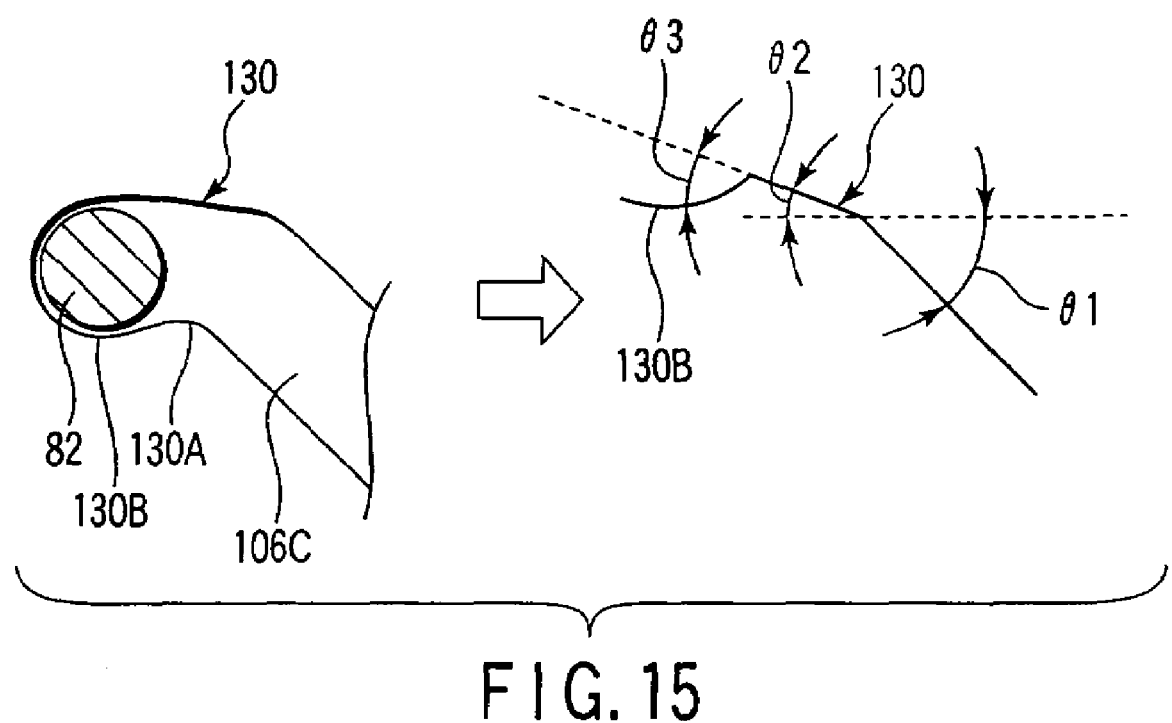
FIG. 15 is an enlarged view showing the distal end shape of a slanted guide of a cam slot used in the driving mechanism shown in FIG. 5.

FIG. 15 is an enlarged view showing the distal end shape of a slanted guide 106C of a cam slot 106 used in the driving mechanism 56 shown in FIG. 5, along with the central axis track of the cam slot 106. When the valve body 52 is pushed against the transfer port 37 or maintenance port 44, it is necessary to sufficiently compress the seal member 58, while receiving a repulsive force to thrust back the valve body 52. Accordingly, in order to lock the position of the valve body 52 at this time, the end of each of the slanted guides 106A and 106C of the cam slot 106 has a special shape. Since the shapes of the slanted guides 106A and 106C are symmetric, only the slanted guide 106C will be explained.

Specifically, the distal end 130 of the slanted guide 106, which corresponds to the position for the valve body to close the port, includes a deceleration portion 130A with an inclination angle θ2 smaller that the inclination angle θ1 of the main portion. The length of the deceleration portion 130A is very small, such as, about 1 to 2 mm. At the deceleration portion 130A, the movement distance of the support rod 54 in the pushing direction is reduced relative to the movement distance of the movable shaft structure 75. Consequently, the pushing force applied to the seal member 58 is increased by that much, thereby ensuring the sealing Further, formed outside the deceleration portion 130A is a lock portion 130B of a small circular arc having an angle θ3 slightly inclined in the inverse direction. The lock portion 130B can lock the cam pin 82 so that it does not slide down along the slanted guide 106. The angle θ3 is set to be small enough for the cam pin 8 to overcome it by slightly compressing the seal member 58 when the valve body 52 is moved in the returning direction. Accordingly, the lock of the cam pin 82 by the lock portion 130B can be easily released by a force in the returning direction.

In the embodiment described above, if the driving mechanism 56 is not used for moving the valve body 52 to the maintenance port 44, the slanted guide 106C on the left side of the cam slot 106 (see FIG. 8B) and the linear guide 116C on the left side of the cam groove 116 (see FIG. 9A) are unnecessary.

In the embodiment described above, the engagement of the cam groove 116 of the spline shaft 78 with the contact element 80 is used for converting the driving force of the movable shaft structure 75 in the axial direction into the rotation movement of the valve body 52. Alternatively, as shown with chain lines in FIG. 4, a rotation drive 140 may be additionally disposed to integrally rotate the entirety of the movable shaft structure 75. Also in this case, as regards reciprocation movement of the valve body 52, the engagement of the cam slot 106 of the hollow shaft 76 with the cam pin 82 is used for converting the driving force of the movable shaft structure 75 in the axial direction into the reciprocation movement of the valve body 52.

For example, in the structure shown in FIG. 5, a rotation drive comprising a motor and gears may be disposed in place of or outside the attachment member 60 to directly or indirectly rotate the cylinder 74 and movable shaft structure 75. In this case, the driving mechanism 56 is only required to have the function of moving the valve body 52 back and forth. The hollow shaft 76 thus only needs to have the slanted guide 106A, without the linear guide 106B and slanted guide 106C. Further, the spline shaft 78 only needs to have the linear guide 116A, without the slanted guide 116B and linear guide 116C.

In the embodiment described above, the cam structure for converting for converting the reciprocation movement of the movable shaft structure 75 in the axial direction into the reciprocation movement of the support rod 54 comprises the combination of the cam slot 106 of the hollow shaft 76 with the cam pin 82 of the support rod 54. Alternatively, a cam structure for the same purpose may comprise a combination of a cam slot formed on the support rod 54 side (e.g., in a member integrated therewith) with a cam pin disposed on the hollow shaft 76 side. Further, in the embodiment described above, the cam structure for converting the reciprocation movement of the movable shaft structure 75 in the axial direction into the rotation movement of the support rod 54 comprises the combination of the cam groove 116 of the spline shaft 78 with the contact element 80 of the guide tube 98. Alternatively, a cam structure for the same purpose may comprise a combination of a cam groove formed on the guide tube 98 side with a contact element disposed on the shaft 78 side.

In the embodiment described above, the target object is exemplified by a semiconductor wafer. Alternatively, the target object may be another substrate, such as a glass substrate, LCD substrate, or ceramic substrate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A gate valve apparatus to be provided for a transfer port through which a target object passes in a vacuum processing system, the apparatus comprising:

a valve body configured to open and close the transfer port and to be moved close to and away from the transfer port by reciprocation movement of the valve body in a first direction;

a support rod connected to the valve body and extending in the first direction;

configured to drive through a driving mechanism;

wherein the driving mechanism comprises a movable shaft structure extending in a second direction substantially perpendicular to the first direction and configured to be reciprocated in the second direction, a first cam structure coupling the movable shaft structure to the support rod, and including a portion configured to convert reciprocation movement of the movable shaft structure in the second direction into reciprocation movement of the support rod in the first direction, and a swing drive configured to swing the support rod and the valve body about a central axis of the movable shaft structure as a center.

2. The apparatus according to claim 1, wherein the driving mechanism further comprises:
a piston head connected to the movable shaft structure;
a cylinder accommodating the piston head while defining first and second airtight spaces one on either side of the piston head; and
a mechanism configured to selectively supply a fluid into the first and second airtight spaces to drive the piston head.

3. The apparatus according to claim 1, wherein the first cam structure comprises a first slanted guide and a first engaging element respectively disposed on one and the other of the movable shaft structure and the support rod to engage with each other, in order to convert reciprocation movement of the movable shaft structure in the second direction into reciprocation movement of the support rod in the first direction, and the first slanted guide is slanted relative to the central axis of the movable shaft structure.

4. The apparatus according to claim 1, wherein the first slanted guide comprises a deceleration portion having a decreased inclination angle at an end corresponding to a position for the valve body to close the transfer port.

5. The apparatus according to claim 4, wherein the first slanted guide further comprises a lock portion disposed outside the deceleration portion and inversely inclined.

6. The apparatus according to claim 1, wherein the swing drive is configured to convert reciprocation movement of the movable shaft structure in the second direction into swing movement of the support rod and the valve body.

7. The apparatus according to claim 6, wherein the swing drive comprises:
a coupling portion coupling the support rod to the movable shaft structure, and configured to rotate the support rod along with the movable shaft structure about the central axis of the movable shaft structure as a center;
a second cam structure coupling the movable shaft structure to a base portion, and including a portion configured to convert reciprocation movement of the movable shaft structure in the second direction into rotation movement of the movable shaft structure about the central axis of the movable shaft structure as a center.

8. The apparatus according to claim 7, wherein the second cam structure comprises a second slanted guide and a second engaging element respectively disposed on one and the other of the base portion and the movable shaft structure to engage with each other, in order to convert reciprocation movement of the movable shaft structure in the second direction into rotation movement of the movable shaft structure about the central axis of the movable shaft structure as a center, and the second slanted guide is slanted relative to the central axis of the movable shaft structure.

9. The apparatus according to claim 8, wherein the first cam structure comprises a first slanted guide and a first engaging element respectively disposed on one and the other of the movable shaft structure and the support rod to engage with each other, in order to convert reciprocation movement of the movable shaft structure in the second direction into reciprocation movement of the support rod in the first direction, and the first slanted guide is slanted relative to the central axis of the movable shaft structure, and
wherein the first cam structure comprises a first linear guide disposed in parallel with the central axis of the movable shaft structure and correspondingly to the second slanted guide, and the second cam structure comprises a second linear guide disposed in parallel with the central axis of the movable shaft structure and correspondingly to the first slanted guide.

10. The apparatus according to claim 7, wherein the movable shaft structure comprises an inner shaft and an outer shaft coaxially disposed to integrally perform reciprocation movement and rotation movement,
wherein the first cam structure comprises a first slanted guide and a first engaging element respectively disposed on one and the other of the outer shaft and the support rod to engage with each other, in order to convert reciprocation movement of the movable shaft structure in the second direction into reciprocation movement of the support rod in the first direction, and the first slanted guide is slanted relative to the central axis of the movable shaft structure, and
wherein the second cam structure comprises a second slanted guide and a second engaging element respectively disposed on one and the other of the base portion and the inner shaft to engage with each other, in order to convert reciprocation movement of the movable shaft structure in the second direction into rotation movement of the movable shaft structure about the central axis of the movable shaft structure as a center, and the second slanted guide is slanted relative to the central axis of the movable shaft structure.

11. The apparatus according to claim 10, wherein the driving mechanism comprises:
a piston head connected to the movable shaft structure;
a cylinder accommodating the piston head, the inner shaft, and the outer shaft while defining first and second airtight spaces one on either side of the piston head; and
a gas supply mechanism configured to selectively supply a gas into the first and second airtight spaces to drive the piston head.

12. The apparatus according to claim 11, wherein the gas supply mechanism comprises a gas passage penetrating the inner shaft and the piston head in an axial direction and connected to the first airtight space.

13. The apparatus according to claim 11, wherein the cylinder is configured to rotate along with the support rod and the movable shaft structure about the central axis of the movable shaft structure as a center.

14. The apparatus according to claim 1, wherein the support rod comprises first and second portions respectively connected to the valve body near opposite ends thereof, and the driving mechanism comprises first and second portions respectively disposed to correspond to the first and second portions of the support rod.

15. The apparatus according to claim 14, wherein the first and second portion of the driving mechanism are connected to each other by a reinforcing member.

16. The apparatus according to claim 1, wherein the swing drive comprises a rotation drive configured to integrally rotate entirety of the movable shaft structure about the central axis of the movable shaft structure as a center, so as to swing the support rod and the valve body.

17. The apparatus according to claim 1, wherein the vacuum processing system comprises a maintenance port, disposed at a position to which the valve body selectively faces within a rotation range of the valve body, to perform a maintenance operation on the gate valve apparatus, and
wherein the first cam structure comprises a portion configured to convert reciprocation movement of the movable shaft structure in the second direction into reciprocation movement of the support rod relative to the maintenance port.

18. The apparatus according to claim 17, wherein the first cam structure comprises a first slanted guide and a first engaging element respectively disposed on one and the other of the movable shaft structure and the support rod to engage with each other, in order to convert reciprocation movement of the movable shaft structure in the second direction into reciprocation movement of the support rod in the first direction, and the first slanted guide is slanted relative to the central axis of the movable shaft structure, and wherein the first cam structure further comprises a third slanted guide connected to the first slanted guide to engage with the first engaging element, in order to convert reciprocation movement of the movable shaft structure in the second direction into reciprocation movement of the support rod relative to the maintenance port.

19. The apparatus according to claim 18, wherein the first and third slanted guides are disposed to form a U-shape or V-shape.

20. A semiconductor processing system comprising:
a pressure-adjustable common transfer chamber having a plurality of side surfaces;
pressure-adjustable first and second process chambers connected to two of the plurality of side surfaces and each configured to perform a semiconductor process on a target object;
a transfer mechanism disposed inside the common transfer chamber to transfer the target object into and from the first and second process chambers; and
gate valve apparatuses respectively disposed between the common transfer chamber and the first process chamber and between the common transfer chamber and the second process chamber,
wherein each of the gate valve apparatuses comprises
a valve body configured to open and close a transfer port through which the target object passes, and to be moved close to and away from the transfer port by reciprocation movement of the valve body in a first direction,
a support rod connected to the valve body and extending in the first direction
configured to drive through a driving mechanism; and
wherein the driving mechanism comprises
a movable shaft structure extending in a second direction substantially perpendicular to the first direction and configured to be reciprocated in the second direction,
a first cam structure coupling the movable shaft structure to the support rod, and including a portion configured to convert reciprocation movement of the movable shaft structure in the second direction into reciprocation movement of the support rod in the first direction, and
a swing drive configured to swing the support rod and the valve body about a central axis of the movable shaft structure as a center.

* * * * *